(12) United States Patent
Nishida et al.

(10) Patent No.: US 8,311,012 B2
(45) Date of Patent: Nov. 13, 2012

(54) MOBILE COMMUNICATION SYSTEM, MOBILE COMMUNICATION METHOD, ACCESS DEVICE, AND GATEWAY INFORMATION STORAGE DEVICE

(75) Inventors: Katsutoshi Nishida, Yokohama (JP); Kazuyuki Kozu, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 548 days.

(21) Appl. No.: 12/522,096

(22) PCT Filed: Dec. 28, 2007

(86) PCT No.: PCT/JP2007/075267
§ 371 (c)(1),
(2), (4) Date: Aug. 18, 2009

(87) PCT Pub. No.: WO2008/081924
PCT Pub. Date: Jul. 10, 2008

(65) Prior Publication Data
US 2010/0002633 A1    Jan. 7, 2010

(30) Foreign Application Priority Data
Jan. 5, 2007    (JP) .................................. 2007-000796

(51) Int. Cl.
*H04W 4/00*    (2009.01)
(52) U.S. Cl. .......................... 370/331; 370/401; 370/328
(58) Field of Classification Search .................. 370/328, 370/401
See application file for complete search history.

(56) References Cited

U.S. PATENT DOCUMENTS
6,545,992 B2    4/2003 Naqvi et al.
(Continued)

FOREIGN PATENT DOCUMENTS
JP    2001 69176    3/2001
(Continued)

OTHER PUBLICATIONS

Japanese Office Action issued on Jan. 18, 2011 in Japanese Patent Application No. 2007-000796 (with English Translation).

(Continued)

*Primary Examiner* — Kenny Lin
*Assistant Examiner* — Faisal Choudhury
(74) *Attorney, Agent, or Firm* — Oblon, Spivak, McClelland, Maier & Neustadt, L.L.P.

(57) ABSTRACT

A gateway information storage device (60) includes a gateway information storage unit (61) which stores gateway information indicating a gateway (GW) to which a mobile terminal (10) is being connected. An access device (20) includes: a gateway information acquiring unit (23) which acquires the gateway information from the gateway information storage device (60) in response to a connection request in handover that is received from the mobile terminal (10); and a connection processor unit (22) which establishes a connection between the mobile terminal (10) and a gateway (GW20B) identified by the gateway information acquired from the gateway information storage device (60).

3 Claims, 13 Drawing Sheets

U.S. PATENT DOCUMENTS

| | | | |
|---|---|---|---|
| 6,904,025 B1* | 6/2005 | Madour et al. | 370/328 |
| 7,822,004 B2* | 10/2010 | Hashimoto et al. | 370/338 |
| 2002/0068568 A1* | 6/2002 | Qing-An | 455/437 |
| 2002/0159421 A1 | 10/2002 | Tanimoto et al. | |
| 2003/0174689 A1 | 9/2003 | Fujino | |
| 2004/0121770 A1* | 6/2004 | Tigerstedt et al. | 455/436 |
| 2005/0122942 A1 | 6/2005 | Rhee et al. | |
| 2007/0121834 A1* | 5/2007 | Mamiya et al. | 379/110.01 |
| 2008/0032704 A1* | 2/2008 | O'Neil et al. | 455/456.1 |
| 2009/0111458 A1* | 4/2009 | Fox et al. | 455/422.1 |
| 2010/0046477 A1* | 2/2010 | Marin et al. | 370/332 |

FOREIGN PATENT DOCUMENTS

| | | |
|---|---|---|
| JP | 2001-508971 | 7/2001 |
| JP | 2002 185500 | 6/2002 |
| JP | 2002 300275 | 10/2002 |
| JP | 2003 511982 | 3/2003 |
| JP | 2003 259422 | 9/2003 |
| JP | 2004 531134 | 10/2004 |
| JP | 2005 176295 | 6/2005 |
| KR | 2002-47204 | 6/2002 |
| WO | WO 98/32303 | 7/1998 |
| WO | WO 01/28185 A1 | 4/2001 |

OTHER PUBLICATIONS

Office Action issued on Jan. 20, 2011 in the corresponding Korean Patent Application No. 10-2009-7014043 (with English Translation).

"3rd Generation Partnership Project; Technical Specification Group Services and System Aspects; General Packet Radio Service (GPRS); Service description; Stage 2", 3GPP TS 23.060 V7.2.0, Technical Specification, (2006).

"3rd Generation Partnership Project; Technical Specification Group Services and System Aspects; 3GPP System Architecture Evolution: Report on Technical Options and Conclusions", 3GPP TR 23.882 V1.4.0, Technical Report, (2006).

"3rd Generation Partnership Project; Technical Specification Group Core Network and Terminals; Numbering, addressing and identification", 3GPP TS 23.003 V7.1.0, Technical Specification, (2006).

Office Action issued Sep. 15, 2011, in Chinese Patent Application No. 200780049301.1 with English translation.

* cited by examiner

FIG. 5
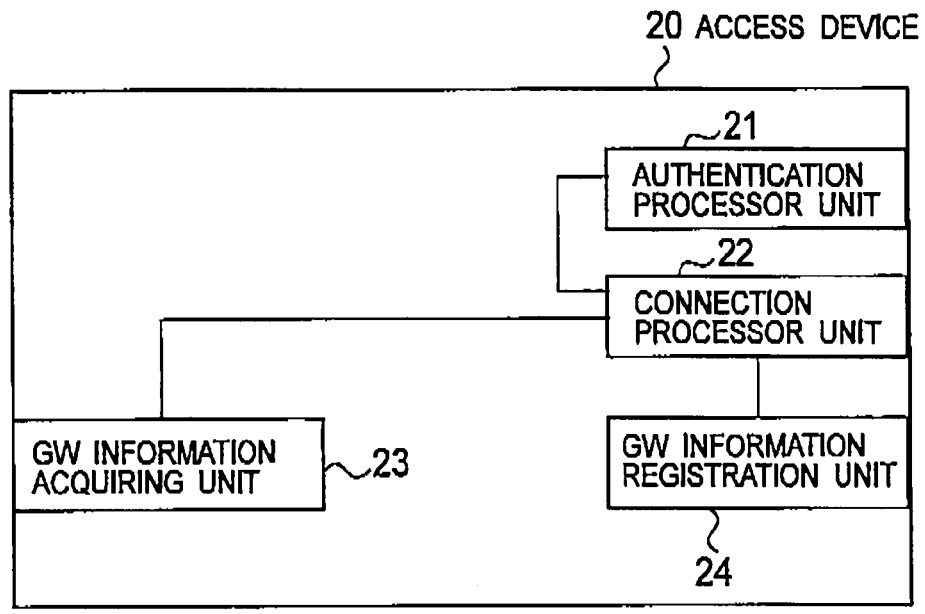
FIG. 6
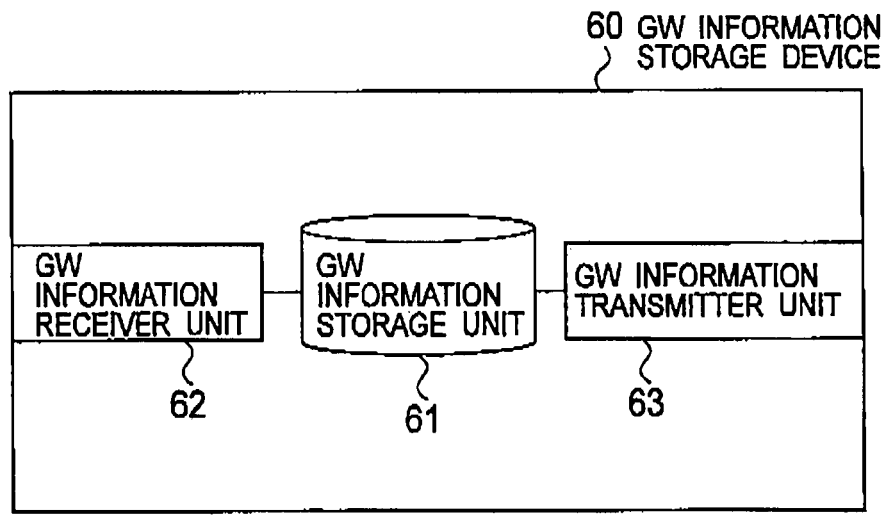
FIG. 7
| UE IDENTIFIER | API IDENTIFIER | CURRENTLY CONNECTED GW | ENTRY EXPIRY DATE |
|---|---|---|---|
| UEID#1 | API#1 | GW30A | – (NO EXPIRY DATE) |
|  | API#2 | GW30K | 9000 |
| UEID#2 | API#1 | GW30C | 9000 |

FIG. 12

| UE IDENTIFIER | API IDENTIFIER | CURRENTLY CONNECTED GW | UNCONNECTED GW LIST | CONNECTION ERROR LIST | ENTRY EXPIRY DATE |
|---|---|---|---|---|---|
| UEID#1 | API#1 | GW30A | GW30C, GW30D | GW30B | (NO EXPIRY DATE) |
| | API#2 | GW30K | GW30L, GW30M, GW30N | ... | 9000 |
| UEID#2 | API#1 | GW30C | GW30A, GW30B, GW30C | ... | 9000 |

FIG. 13

(a) IDENTIFICATION INFORMATION OF CONNECTION DESTINATION NETWORK (APN): <Label>.<MNCxxx>.<MCCyyy>.GPRS (b) IDENTIFICATION INFORMATION OF MOBILE TERMINAL (UEID) (IMSI):<xxx>+<yyy>+MSIN (format : MNC+MCC+MSIN)

(c) CREATED IDENTIFICATION INFORMATION (NAI):MSIN@<Label>.<MNCxxx>.<MCCyyy>.GPRS

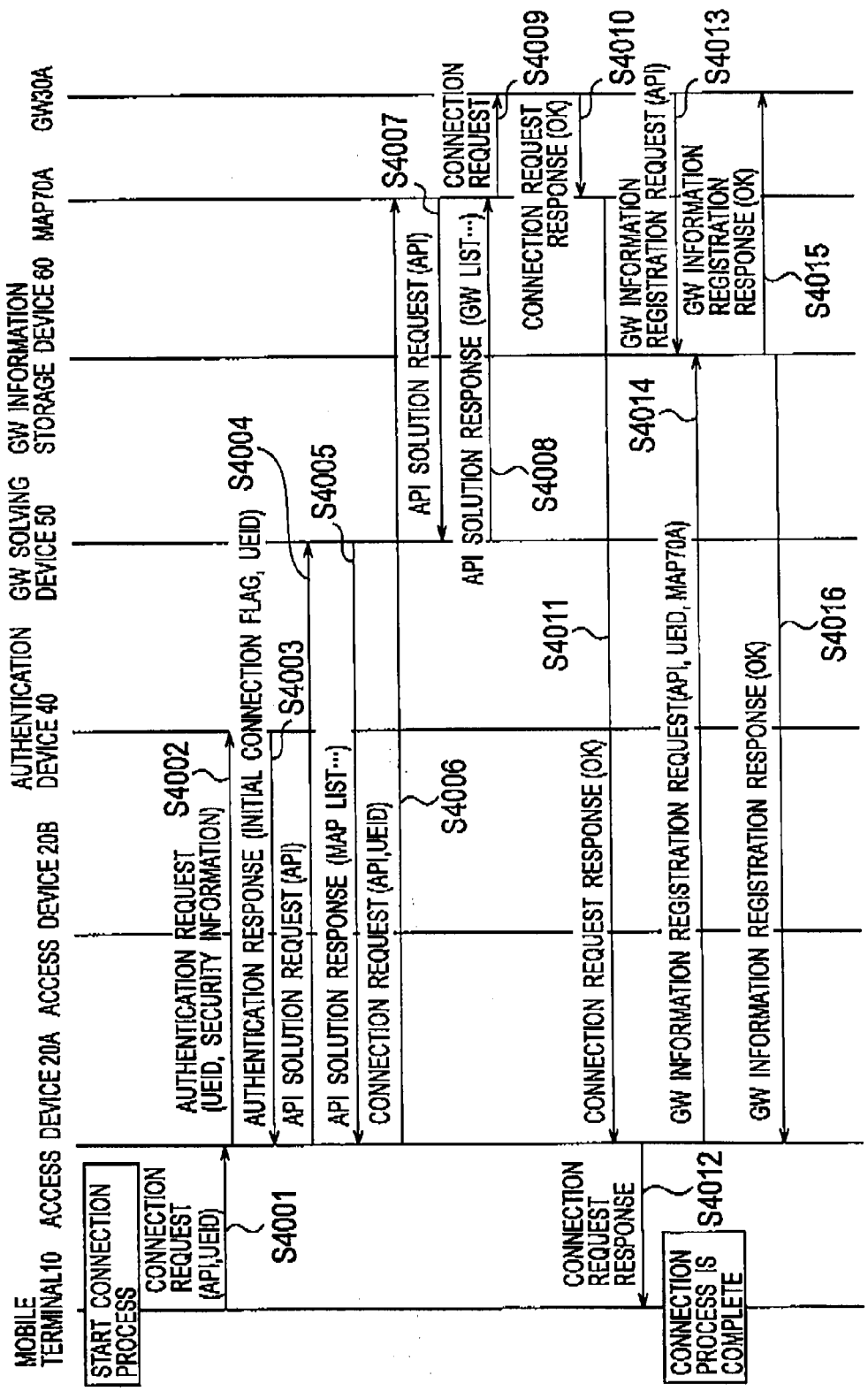

MOBILE COMMUNICATION SYSTEM, MOBILE COMMUNICATION METHOD, ACCESS DEVICE, AND GATEWAY INFORMATION STORAGE DEVICE

TECHNICAL FIELD

The present invention relates to a mobile communication system, a mobile communication method, an access device, and a gateway information storage device.

BACKGROUND ART

Conventionally, there has been known the 3GPP GPRS network, which is an example of a mobile communication network (mobile network) provided with multiple gateways (hereinafter referred to as GWs) (see "FIG. 64: PDP Context Activation Procedure for Iu mode" of Non-Patent Document 1, for example).

As shown in FIG. 1, in the GPRS network, when a communication starts, a mobile terminal MS notifies an exchange SGSN (serving GPRS support node) of an "access point name (APN)" indicating a connection destination network, by using a message 1.

Accordingly, by inquiring of a GW solution device such as a DNS (domain name server), the exchange SGSN identifies an exchange GGSN (gateway GPRS support node) that is a gateway.

Then, the exchange SGSN sets up a route to the exchange (gateway) GGSN through exchange of messages 4 and 9.

In a handover preparation procedure for a case where the mobile terminal MS moves across the exchanges SGSN during a communication, the exchange SGSN before the handover (former SGSN) notifies the exchange SGSN after the handover (new SGSN) of context information (including GGSN information) on the mobile terminal MS, by using a message 3, as shown in FIG. 2.

Accordingly, the exchange SGSN after the handover (new SGSN) becomes able to uniquely identify the exchange GGSN used before the handover by the mobile terminal MS, and thus to set up a route to the exchange GGSN by exchanging messages 13.

As a result, even after the handover of the mobile terminal MS, a mobility service can be provided to the mobile terminal MS by utilizing the same exchange GGSN (See "FIG. 42: Combined Hard Handover and SRNS Relocation Procedure" of Non-Patent Document 1).

The mobile communication network described above is based on the assumption that before and after the handover, the context information on the mobile terminal can be transferred between the access devices (the exchanges SGSN in the above example) that perform a process of changing a routing path in the network in response to movement of the mobile terminal.

That is, during a handover, using a function to transfer the context information allows the access devices to share information on GW (the exchange GGSN in the above example) used by the mobile terminal MS. Thus, the same gateway can be selected before and after the handover.

Non-Patent Document 1: "General Packet Radio Service (GPRS): Service description: Stage 2", 3GPP TS23.060 V7.2.0, September 2006

Non-Patent Document 2: "3GPP System Architecture Evolution: Report on Technical Options and Conclusions", 3GPP TR23.882 V 1.4.0, September 2006

Non-Patent Document 3: "Numbering, addressing and identification", 3GPP TS23.003 V7.1.0, September 2006

DISCLOSURE OF THE INVENTION

As in a handover between 3GPP and Non 3GPP shown in Non-Patent Document 2, however, there is a case where the function of transferring context information as mentioned above is not available for access devices ("MME/UPE" and "ePDG" in Non-Patent Document 2). In this case, a problem arises that, as shown in FIG. 2, after the handover of the mobile terminal, the access device cannot uniquely identify the GW used before the handover by the mobile terminal.

As shown in FIG. 3, for example, the mobile terminal 10 transmitting an initial connection request to an access device 20A (corresponding to the "MME/UPE" of Non-Patent Document 2) notifies the access device 20A of information (AFN) identifying a connection destination network, by using the initial connection request (Step S5001).

In step S5002, the access device 20A performs an authentication process in cooperation with an authentication process device 40, and, in steps S5003 and S5004, acquires information (SAE-A IP add list) on multiple GWs corresponding to the APN, from the GW solution device 50.

The access device 20A acquires the information (SAE-A IP add list) on the multiple GWs (GW30A/GW30B/GW30C), from the GW solution device 50 in step S5004, and selects the GW30A as a preferred connection destination according to a policy or the like in the connection destination network (i.e., selects SAE-A to connect) in step S5005.

When the GW30A is in an inaccessible condition due to a failure or the like, a connection process with the GW30A fails and results in an error (step S5006). Then, in steps S5007 and S5008, the access device 20A starts the connection process with the GW30B having the next highest priority (i.e., reselects SAE-A to connect).

Afterward, in step S5009A, upon arrival at a place under the control of an access device 20B (corresponding to "ePDG" of Non-Patent Document 2), the mobile terminal 10 restarts the connection process with the connection destination network again (step S5010). However, since the context information cannot be transferred between the access device 20A and the access device 20B, the access device 20B has no way to learn that a connection cannot be established between the mobile terminal 10 and the GW30A.

Thus, the access device 20B has to go through the procedure of: selecting the GW30A having the highest priority from the information (SAE-A IP add list) on the multiple GWs that is acquired from the GW solution device 50 in step S5013 (step S5014); performing the connection process between the selected GW30A and the mobile terminal 10 again (step S5015); and performing the connection process with the GW3OB again in step S5017, after detecting an error on the connection process.

Consequently, there is a problem of an increase in the handover delay time that the mobile terminal 10 has to go through.

In addition, besides the case where a failure or the like occurs in a GW, the above-described problem similarly occurs in the case where a connection destination GW is randomly determined to distribute load, by each access device.

Hence, the present invention has been made in view of the problems described above, and an object of the present invention is to provide a mobile communication system, a mobile communication method, an access device, and a gateway information storage device capable of achieving the followings: when a mobile terminal moves between access devices not provided with a function to transfer context information, uniquely identifying a GW which a mobile terminal uses before moving; avoiding occurrence of a delay in the connection time attributable to an inappropriate selection of a GW that occurs during a handover due to the selection policy of a GW or GW congestion, failure of a GW, or the like, which is a problem in the conventional mobile communication system; and preventing a delay in a handover process from increasing.

A first aspect of the present invention is summarized as a mobile communication system a mobile communication system including a gateway information storage device and an access device, wherein the gateway information storage device includes a gateway information storage unit configured to store gateway information indicating a gateway to which a mobile terminal is being connected, and the access device includes: a gateway information acquiring unit configured to acquire the gateway information from the gateway information storage device in response to a connection request in handover that is received from the mobile terminal; and a connection processor unit configured to establish a connection between the mobile terminal and a gateway identified by the gateway information acquired from the gateway information storage device.

In the first aspect, the gateway information can be information which associates at least one of identification information of a gateway whose connection to the mobile terminal has failed to be established, and identification information of a gateway whose connection with the mobile terminal has not been attempted to be established, with identification information of the mobile terminal, identification information of the gateway to which the mobile terminal is being connected, and identification information of a network to which the mobile terminal is being connected by way of the gateway.

In the first aspect, the identification information of the mobile terminal and the identification information of the network can form one piece of identification information.

In the first aspect, the mobile communication system can include a gateway solution device configured to manage a gateway to be connected to the mobile terminal, wherein the connection processor unit can be configured to establish a connection between the mobile terminal and a gateway designated by the gateway solution device, when receiving a connection request from the mobile terminal that has not established a connection to a gateway, and a function of the gateway information storage device can be provided in the gateway solution device.

A second aspect of the present invention is summarized as a mobile communication method performed by a gateway information storage device and an access device, the method including the steps of: storing, at the gateway information storage device, gateway information indicating a gateway to which a mobile terminal is being connected; acquiring, at the access device, the gateway information from the gateway information storage device in response to a connection request in handover that is received from the mobile terminal; and establishing, at the access device, a connection between the mobile terminal and a gateway identified by the gateway information acquired from the gateway information storage device.

A third aspect of the present invention is summarized as an access device, including: a gateway information acquiring unit configured to acquire gateway information from a gateway information storage device in response to a connection request in handover that is received from a mobile terminal, the gateway information indicating a gateway to which the mobile terminal is being connected; and a connection processor unit configured to establish a connection between the mobile terminal and a gateway identified by the gateway information acquired from the gateway information storage device.

In the third aspect, the connection processor unit can be configured to establish a connection between the mobile station and a gateway designated by a gateway solution device configured to manage a gateway to be connected to the mobile terminal, when receiving a connection request from the mobile terminal that has not established a connection to a gateway.

A forth aspect of the present invention is summarized as a gateway information storage device, including: a gateway information storage unit configured to store gateway information which associates at least one of identification information of a gateway whose connection to the mobile terminal has failed to be established, and identification information of a gateway whose connection with the mobile terminal has not been attempted to be established, with identification information of the mobile terminal, identification information of a gateway to which a mobile terminal is being connected, and identification information of a network to which the mobile terminal is being connected by way of the gateway; a gateway information transmitter unit configured to transmit the gateway information in response to a request from an access device; and a gateway information receiver unit configured to update the gateway information in response to a notification from the access device.

In the forth aspect, the identification information of the mobile terminal and the identification information of the network can form one piece of identification information.

As described above, according to the present invention, it is possible to provide a mobile communication system, a mobile communication method, an access device, and a gateway information storage device capable of achieving the followings: when a mobile terminal moves between access devices not provided with a function to transfer context information, uniquely identifying a GW which a mobile terminal uses before moving; avoiding occurrence of a delay in the connection time attributable to an inappropriate selection of a GW that occurs during a handover due to the selection policy of a GW or GW congestion, failure of a GW, or the like, which is a problem in the conventional mobile communication system; and preventing a delay in a handover process from increasing.

BRIEF DESCRIPTION OF THE DRAWINGS

FIG. 5 is a functional block diagram of an access device according to the first embodiment of the present invention.

FIG. 6 is a functional block diagram of a GW information storage device according to the first embodiment of the present invention.

FIG. 7 is a diagram showing one example of GW information stored by the GW information storage device according to the first embodiment of the present invention.

FIG. 12 is a diagram showing one example of GW information stored by the GW information storage device according to Modification 1 of the present invention.

FIG. 13 is a diagram showing one example of an identifier to be used in the GW information stored in the GW information storage device according to Modification 2 of the present invention.

FIG. 15 is a sequence diagram showing a connection process during normal operation in the mobile communication system according to Modification 5 of the present invention.

BEST MODES FOR CARRYING OUT THE INVENTION

Configuration of Mobile Communication System according to First Embodiment of Present Invention A configuration of a mobile communication system according to a first embodiment of the present invention will be described with reference to FIG. 4 to FIG. 7.

Figure 1:
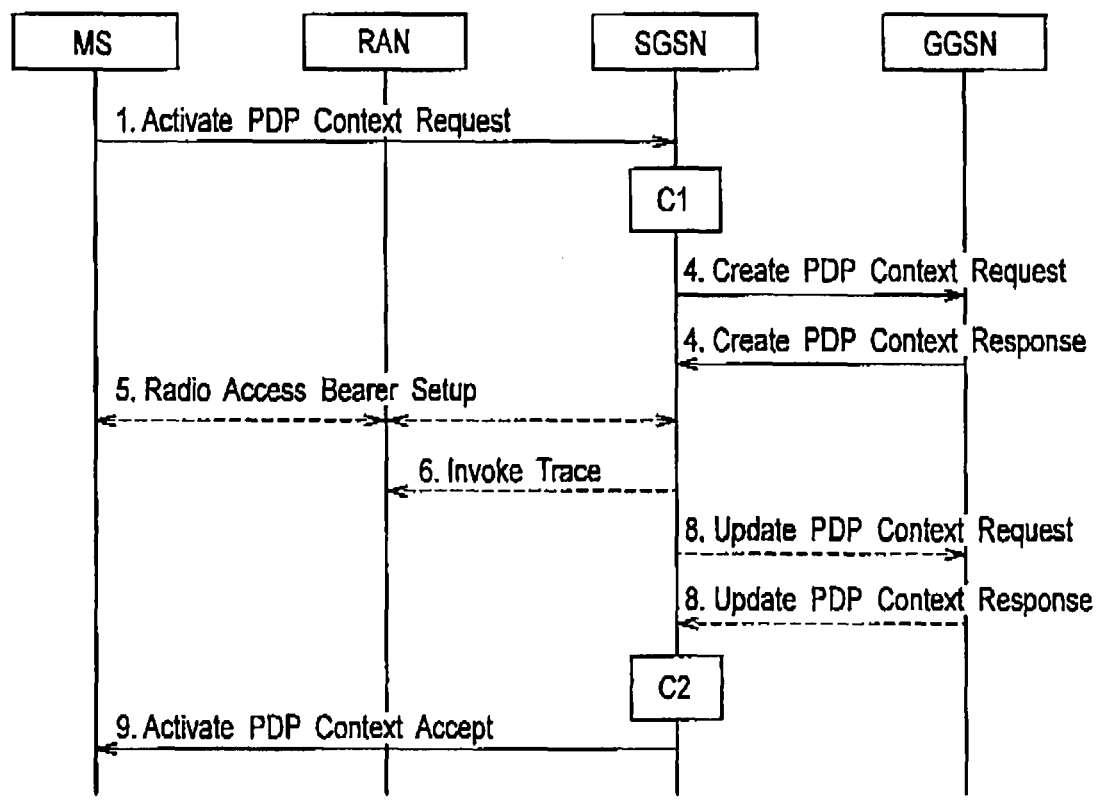
FIG. 1 is sequence diagram showing operation to set up a route between a mobile terminal MS and an exchange GGSN in the conventional 3GPP GPRS network.
Figure 2:
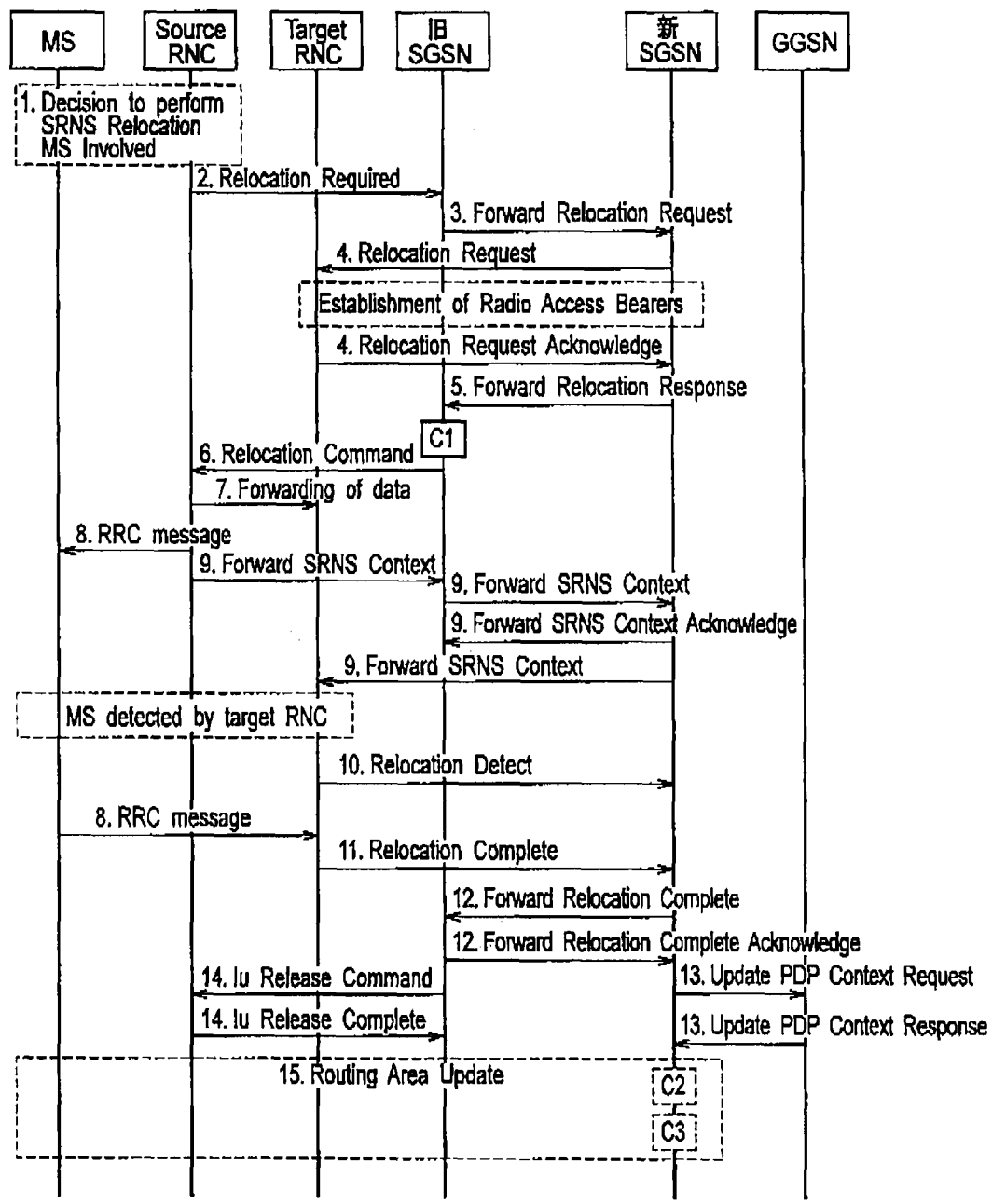
FIG. 2 is a sequence diagram showing operation when the mobile terminal MS performs a handover in the conventional 3GPP GPRS network.
Figure 3:
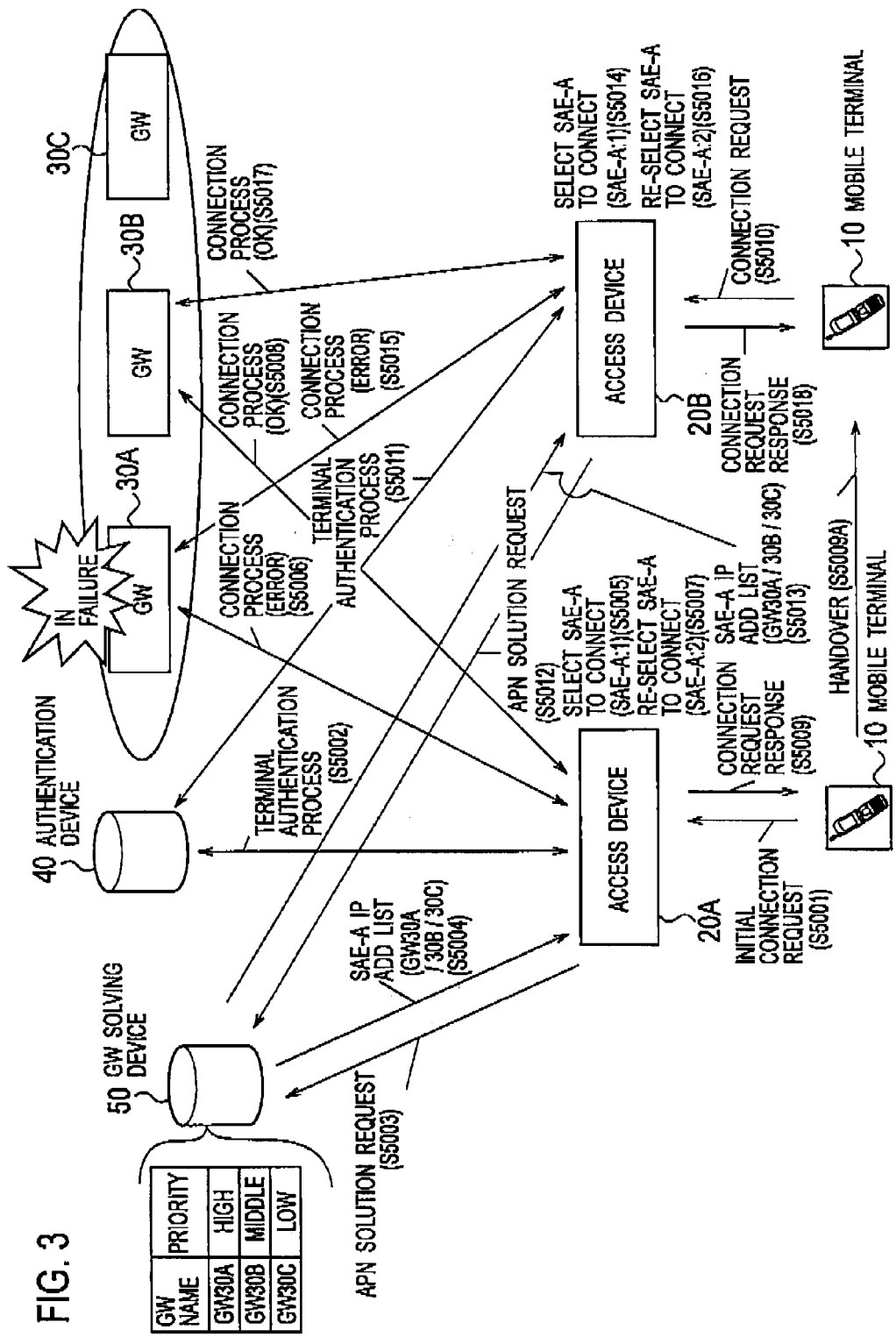
FIG. 3 is a diagram for describing problems in the conventional 3GPP GPRS network.
Figure 4:
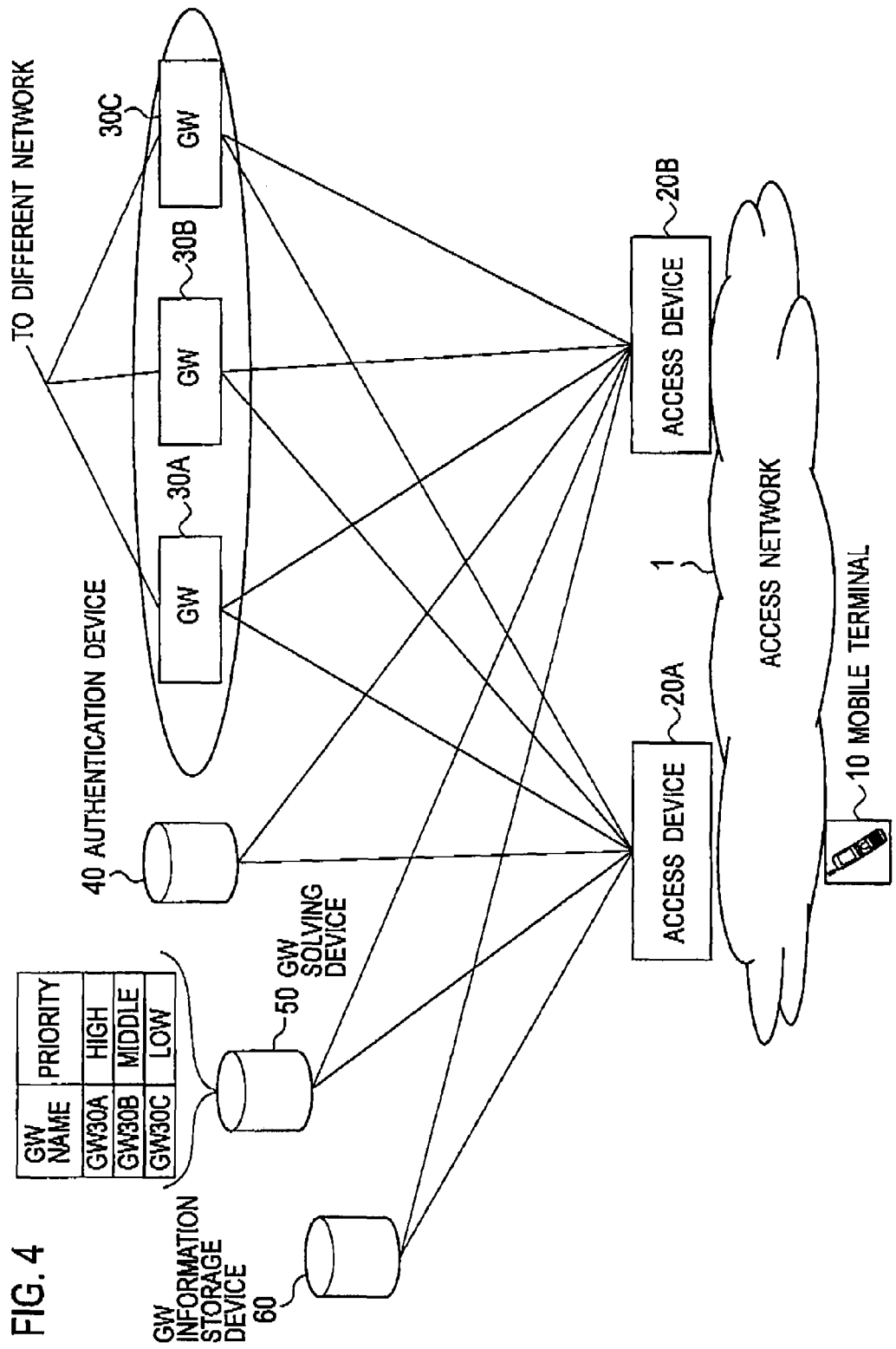
FIG. 4 is a diagram of an overall configuration of a mobile communication system according to a first embodiment of the present invention.

As shown in FIG. 4, the mobile communication system according to this embodiment includes a plurality of access devices 20A and 20B, a plurality of GWs 30A to 30C, an authentication device 40, a GW solution device 50, and a GW information storage device 60.

The access device 20 is configured to accommodate a mobile terminal 10 by way of an access network 1 (wireless network or wired network).

As shown in FIG. 5, each of the access device 20A and the access device 20B includes an authentication processor unit 21, a connection processor unit 22, a GW information acquiring unit 23, and a GW information registration unit 24. Since functions of the access device 20A are basically identical to functions of the access device 20B, the functions of both of the access devices will be hereinafter described collectively by using the expression "access device 20", as necessary.

The authentication processor unit 21 is configured to perform an authentication process for the mobile terminal 10 by transmitting an authentication request to the authentication device 40 in response to a connection request from the mobile terminal 10.

The GW information acquiring unit 23 is configured to acquire GW information indicating a GW to which the mobile terminal 10 is being connected, from the GW information storage device 60 in response to a connection request in handover that is received from the mobile terminal 10.

The connection processor unit 22 is configured to establish a connection between the mobile terminal 10 and a gateway.

Specifically, the connection processor unit 22 is configured to perform a connection process by: selecting a GW to be connected to the mobile terminal 10, according to information on GWs (GW list) acquired from the GW solution device 50, when receiving an initial connection request from the mobile terminal 10; and transmitting a connection request to the selected GW, thereby establishing a connection between the selected GW and the mobile terminal 10.

In addition, the connection processor unit 22 is configured to perform a connection process for establishing a connection between a GW and the mobile terminal 10, when receiving a connection request in handover from the mobile terminal 10a, the GW being identified by the GW information acquired from the GW information storage device 60 by the GW information acquiring unit 23.

Here, it is possible to have a configuration in which a judgment as to whether the connection request transmitted from the mobile terminal 10 is an "initial connection request" or a "connection request in handover", is made by a "flag (initial connection flag or HO flag)" contained in an authentication-request response transmitted from the authentication device 40.

In addition, since it is likely that there exist a plurality of GWs providing connections to a different network, the connection processor unit 22 has a function to select a GW to be preferentially subjected to the connection process, from the plurality of GWs, the selection being made according to a network policy or the like.

The GW information registration unit 24 is configured to update the GW information stored in the GW information storage device 60 by transmitting a SW information registration request to the GW information storage device 60 after the connection between the above GW and the mobile terminal 10 is established.

The GWs 30A to 30C are each configured to provide the mobile terminal 10 with a connection to the different desired network.

The authentication device 40 is configured to perform an authentication process for the mobile terminal 10 in response to an authentication request transmitted from the access device 20.

Moreover, the authentication device 40 may be configured to make a judgment as to whether a connection between the mobile terminal 10 and a GW has been established, that is, judgment as to whether the connection request transmitted from the mobile terminal 10 to the access device 20 is an "initial connection request" or a "connection request in handover".

In addition, the authentication device 40 is configured to transmit to the access device 20 an authentication request response for notifying the access device 20 of result of the authentication process and result of the judgment described above.

The GW solution device 50 is configured to manage a GW to be connected to the mobile terminal 10.

More specifically, the GW solution device 50 holds information on GWs (GW list) corresponding to identification information (API) of the different network, and is configured to provide the access device 26 with the GW list in response to an API solution request from the access device 20.

In addition, as shown in FIG. 4, the GW solution device 50 may be configured to prioritize and manage GWs to be connected to the mobile terminal 10.

The GW information storage device 60 is configured to manage a GW that is currently used by the mobile terminal 10 to perform a communication with the different network.

Specifically, as shown in FIG. 6, the GW information storage device 60 includes a GW information storage unit 61, a GW information receiver unit 62, and a GW information transmitter unit 63.

The GW information storage unit 61 is configured to store GW information indicating a GW currently used by the mobile terminal 10 to perform a communication with the different network (i.e., a GW to which the mobile terminal 10 is being connected).

Specifically, as shown in FIG. 7, the GW information storage unit 61 is configured to store the GW information which associates a "UE identifier (identification information of the mobile terminal)", "currently connected GW (identification information of a GW to which the mobile terminal is being connected)", an "API identifier (identification information of a network to which the mobile terminal is being connected via the GW)", and an "entry expiry date" with each other. The "entry expiry date" herein indicates an expiry date of the entry of GW information.

In addition, the GW information storage unit 61 may be configured to autonomously delete the entry whose "entry expiry date" has been expired and also configured to stop notifying other nodes of the deleted entry.

In addition, the GW information storage unit 61 is configured to delete any entry whose "entry expiry date" is indefinite, only when the mobile terminal 10 completely terminates connections to connection destination networks, that is, when the mobile terminal 10 receives a disconnection request containing only a "UEID" from the access device 20 and terminates connections to all the connection destination networks.

In addition, the "entry expiry date" may be configured to be set in accordance with an operator policy or the like, or set in accordance with expiry date information attached to a GW information registration request, for example.

The GW information receiver unit 62 is configured to update (register, change, delete) the GW information stored in the GW information storage unit 61, in response to a notification (GW information registration request) from the access device 20.

The GW information transmitter unit 63 is configured to transmit GW information to the access device 20, in response to a request (GW information request) from the access device 20, the GW information corresponding to the request.

Operation of Mobile Communication System
according to First Embodiment of Present Invention The operation of a mobile communication system according to the first embodiment of the present invention will be described with reference to FIG. 8 to FIG. 11.

First, the operation during normal time in the mobile communication system according to this embodiment will be described with reference to FIG. 8.

Figure 8:
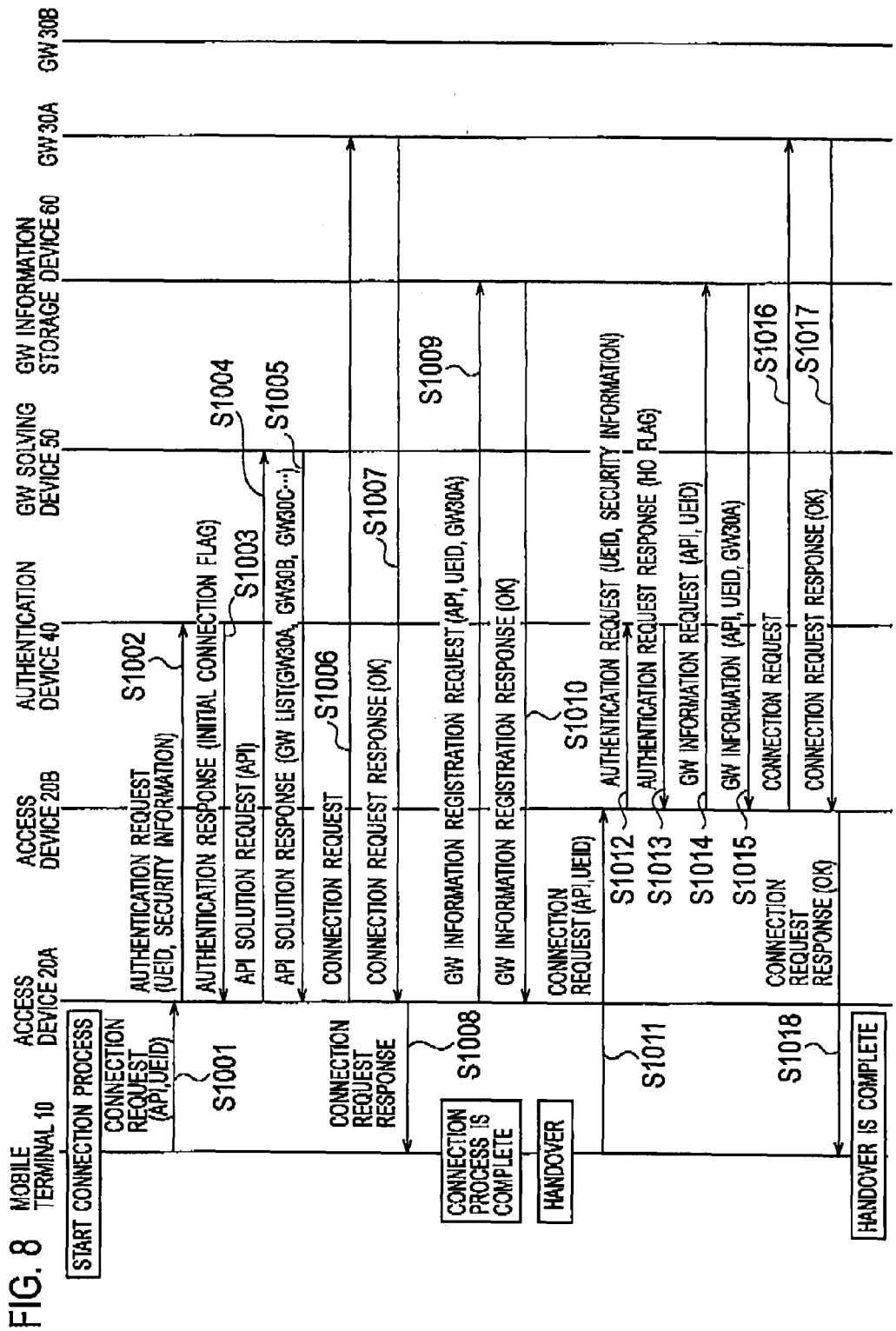
FIG. 8 is a sequence diagram showing a connection process during normal operation in the mobile communication system according to the first embodiment of the present invention.

As shown in FIG. 8, when it is determined to start a process of establishing a connection to the access device 20A, in step 1001, the mobile terminal 10 transmits a connection request containing an "UEID" that is identification information of the mobile terminal and an "API" indicating identification information of a desired connection destination network, to the access device 20A.

In step S1002, the access device 20A transmits an authentication request containing the "UEID" and security information, to the authentication device 40.

In step 1003, in response to the authentication request transmitted from the access device 20A, the authentication device 40 performs an authentication process for the mobile terminal 10 identified by the "UEID" contained in the authentication request.

Next, when the result of the authentication is OK, the authentication device 40 refers to the connection status of a mobile terminal which the authentication device 40 itself manages, and judges whether or not a connection has already been established between the mobile terminal 10 and a GW.

Then, the authentication device 40 transmits an authentication response containing an initial connection flag indicating the judgment result and the authentication result, to the access device 20A. Here, the initial connection flag notifies that a connection between the mobile terminal 10 and a GW has not yet been established.

In step S1004, when receiving the authentication response containing a positive authentication result from the authentication device 40, the access device 20A transmits an API solution request to the GW solution device 50, the API solution request being for searching for a GW that provides a connection to a desired connection destination network. Note that the API solution request contains the "API" that is the identification information of the desired connection destination network.

In step S1005, the GW solution device 50 searches a GW list (e.g., GW30A/30B/30C . . . ) corresponding to the "API" contained in the received API solution request, and transmits an API solution response containing the searched GW list to the access device 20A.

In step S1006, from the GW list contained in the received API solution response, the access device 20A selects the GW30A as the GW to be subjected to the connection process, according to a network policy or the like, and then transmits a connection request to the selected GW30A.

In step S1007, if the GW30A can accept the connection request transmitted from the access device 20A, the GW30A sets up a route for transferring packets to the mobile terminal 10, and returns a connection request response (OK) to the access device 20A.

In step S1008, the access device 20A transmits a connection request response for notifying that a connection has been established between the mobile device 10 and the GW30, to the mobile terminal 10.

In step S1009, the access device 20A transmits a GW information registration request to the GW information storage device 60, the GW information registration request being for requesting registration of GW information which associates the "UEID" that is the identification information of the mobile terminal 10, the "API" that is the identification information of the desired connection destination network, and the identification information of the GW30A, with each other.

In step S1010, the GW information storage device 60 registers the GW information contained in the received GW information registration request, and transmits a GW information registration response (OK) indicating that the registration process has been completed, to the access device 20A.

Then, the mobile terminal 10 performs a handover to the control under the different access device 20B. After that, in step S1011, the mobile terminal 10 transmits a connection request containing the "UEID" that is the identification information of the mobile terminal 10 and the "API" that is the identification information of the desired connection destination network, to the access device 20B.

In step S1012, the access device 20B transmits an authentication request containing the "UEID" and security information, to the authentication device 40.

In step S1013, in response to the authentication request transmitted from the access device 20B, the authentication device 40 performs an authentication process for the mobile terminal 10 identified by the "UEID" contained in the authentication request.

Next, when the authentication result is OK, the authentication device 40 refers to the connection status of the mobile terminal which the authentication device 40 itself manages, and judges whether or not a connection has been already established between the mobile terminal 10 and a GW.

Then, the authentication device 40 transmits an authentication response containing an HO flag indicating the judgment result and the authentication result, to the access device 20B. Here, the HO flag notifies that a connection has been already established between the mobile terminal 10 and the GW30A.

In step S1014, when receiving the authentication response containing a positive authentication result and the HO flag from the authentication device 40, the access device 20B transmits a GW information request to the GW information storage device 60, without transmitting an API solution request to the GW solution device 40, the GW information request being for inquiring about a GW to which the mobile terminal 10 is being connected. Note that the API solution request contains the "UEID" that is the identification information of the mobile terminal 10 and the "API" that is the identification information of the desired connection destination network.

In step S1015, according to the "UEID" and the "API" contained in the received GW information request, the GW information storage device 60 transmits GW information indicating the GW to which the mobile terminal 10 is being connected, to the access device 20B. The GW information transmitted at this time is information which associates the "UEID" that is the identification information of the mobile terminal 10, the "API" that is the identification information of the desired connection destination network, and the identification information of the GW30A, with each other.

In step S1016, the access device 20B transmits a connection request to the GW30A identified by the received GW information.

In step S1017, if the GW30A can accept the connection request transmitted from the access device 20B, the GW30A sets up a route for transferring packets to the mobile terminal 10 and returns a connection request response (OK) to the access device 20B.

In step S1018, the access device 20B transmits a connection request response for notifying that a connection has been established between the mobile terminal 10 and the GW30A, to the mobile terminal 10.

Figure 9:
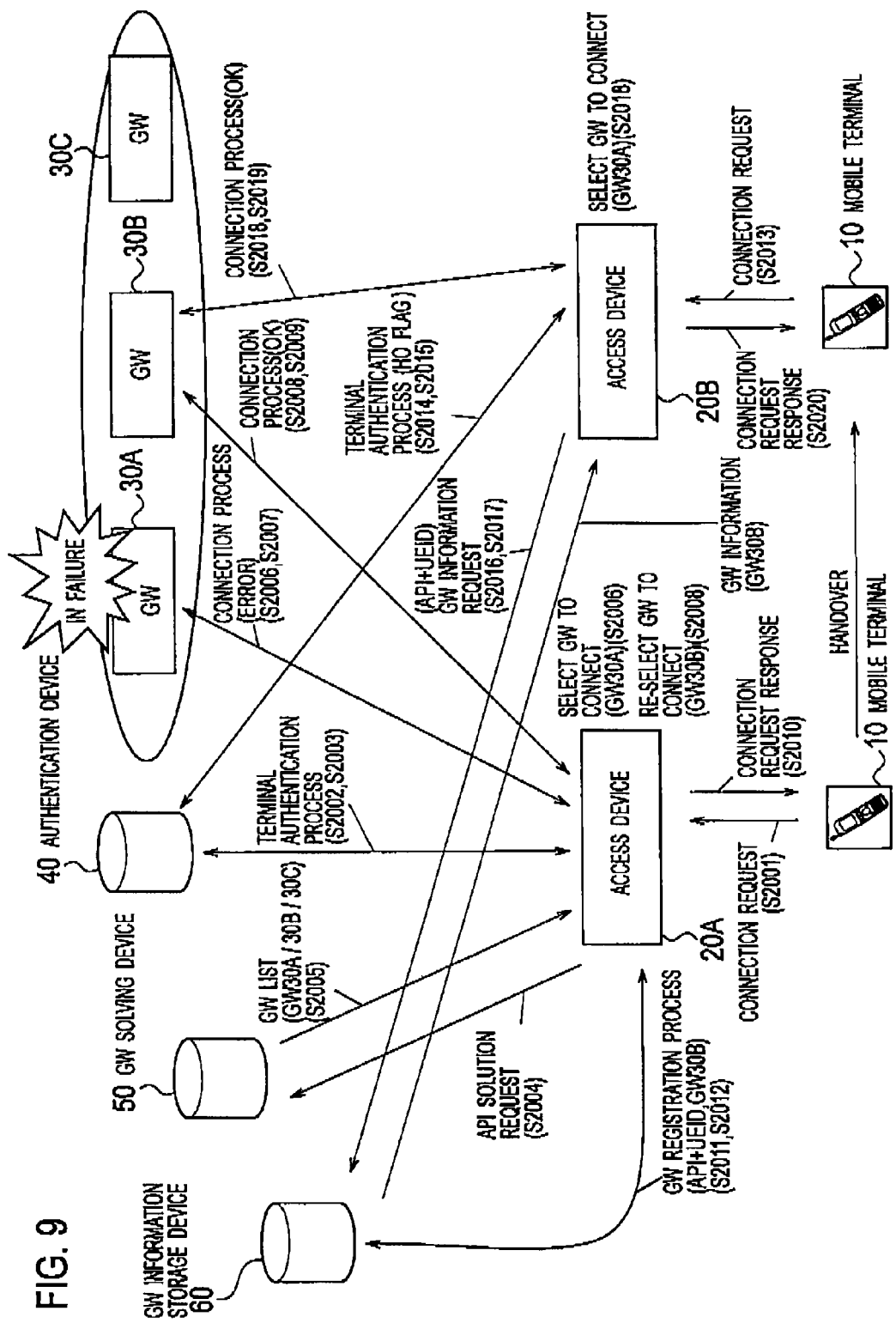
FIG. 9 is a diagram for describing a connection process when a failure occurs in a GW30A in the mobile communication system according to the first embodiment of the present invention.
Figure 10:
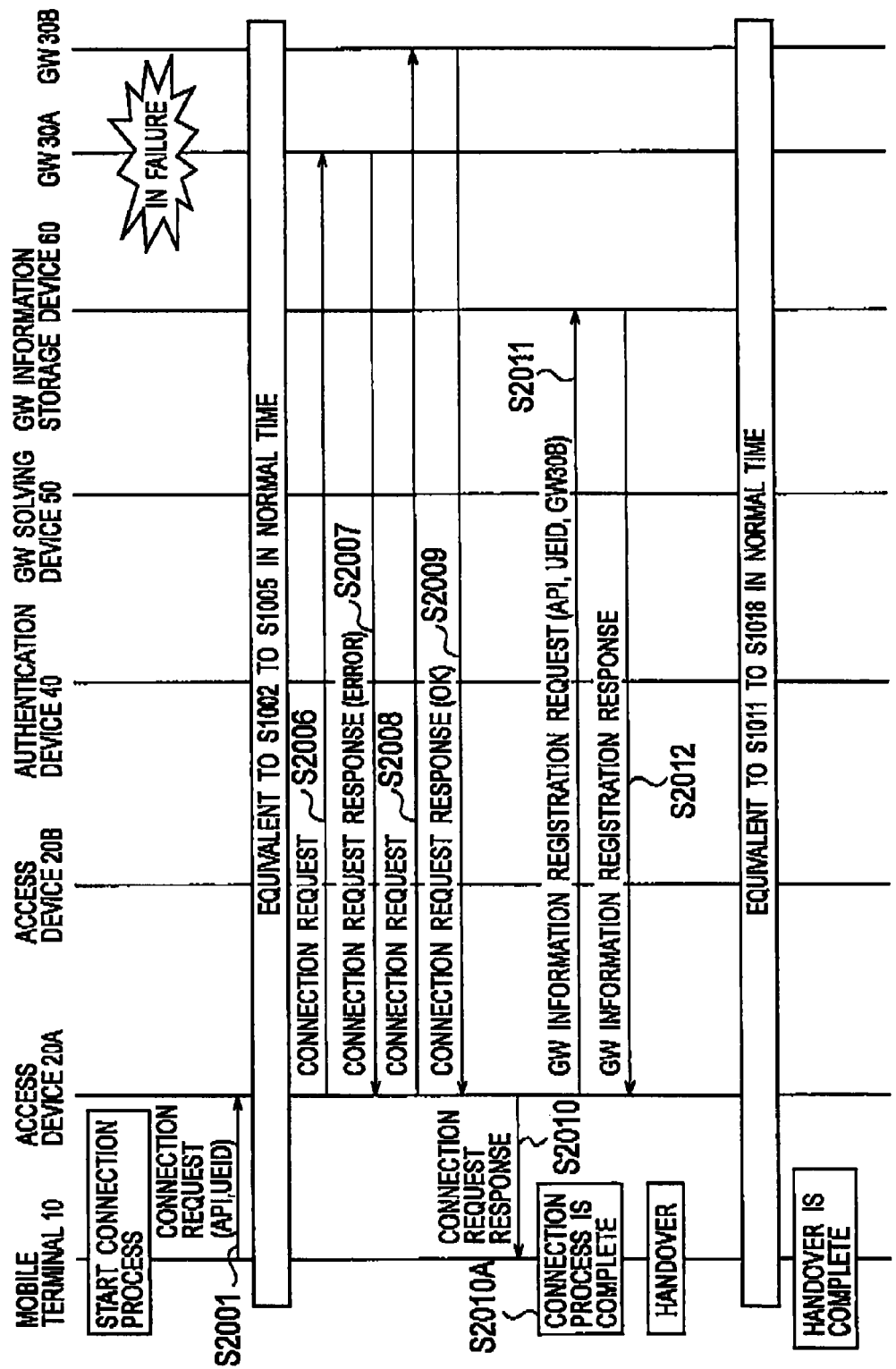
FIG. 10 is a sequence diagram showing the connection process when the failure occurs in the GW30A in the communication system according to the first embodiment of the present invention.

Secondly, the operation when the GW30 is in failure in the mobile communication system according to this embodiment will be described with reference to FIG. 9 and FIG. 10.

Since the operation of step S2001 to S2005 is identical to the operation of step S1001 to S1005 shown in FIG. 8, descriptions thereof will be omitted.

In step S2006, from the GW list contained in the received API solution response, the access device 20A selects the GW30A as the GW to be subjected to the connection process, according to a network policy or the like, and then transmits a connection request to the selected GW30A.

The GW30, however, is in failure, and thus, in step S1007, the access device 20A either receives a connection request response (error) notifying that the connection process with the GW30A has been failed, or does not receive a connection request response (OK) and a response waiting timer expires.

In step S2008, the access device 20A selects the GW30B having the next highest priority from the GW list contained in the received API solution response, and transmits a connection request to the selected GW30B.

In step S2009, if the GW30B can accept the connection request transmitted from the access device 20A, the GW30B sets up a route for transferring packets to the mobile terminal 10, and returns a connection request response (OK) to the access device 20A.

In step S2010, the access device 20A transmits a connection request response for notifying that a connection has been established between the mobile terminal 10 and the GW30B, to the mobile terminal 10.

In step S2011, the access device 20A transmits a GW information registration request to the GW information storage device 60, the GW information registration request requesting registration of GW information which associates the "UEID" that is the identification information of the mobile terminal 10, the "API" that is the identification information of the desired connection destination network, and identification information of GW30B, with each other.

In step S2012, the GW information storage device 60 registers the GW information contained in the received GW information registration request, and transmits a GW information registration response (OK) indicating that the registration has been completed, to the access device 20A.

Then, the mobile terminal 10 performs a handover to the control under the different access device 20B. After that, in step S2013, the mobile terminal 10 transmits a connection request containing the "UEID" that is the identification information of the mobile terminal 10 and the "API" that is the identification information of the desired connection destination network, to the access device 20B.

In step S2014, the access device 20B transmits an authentication request containing the "UEID" and security information, to the authentication device 40.

In step S2015, in response to the authentication request transmitted from the access device 20B, the authentication device 40 performs an authentication process for the mobile terminal 10 identified by the "UEID" contained in the authentication request.

Next, when the authentication result is OK, the authentication device 40 refers to the connection status of the mobile terminal which the authentication device 40 itself manages, and judges whether or not a connection has already been established between the mobile terminal 10 and a GW.

Then, the authentication device 40 transmits an authentication response containing an HO flag indicating the judgment result and the authentication result, to the access device 20B. Here, the HO flag notifies that a connection has already been established between the mobile terminal 10 and the GW30B.

In step S2016, when receiving the authentication response containing a positive authentication result and the HO flag from the authentication device 40, the access device 20B transmits a GW information request to the GW information storage device 60, without transmitting an API solution request to the GW solution device 40, the GW information request being for inquiring about a GW to which the mobile terminal is being connected. Note that the API solution request contains the "UEID" that is the identification information of the mobile terminal 10 and the "API" that is the identification information of the desired connection destination network.

In step S2017, according to the "UEID" and the "API" contained in the received GW information request, the GW information storage device 60 transmits GW information indicating the GW to which the mobile terminal 10 is being connected, to the access device 20B. The GW information transmitted at this time is information which associates the "UEID" that is the identification information of the mobile terminal 10, the "API" that is the identification information of the desired connection network, and the identification information of the GW30B, with each other.

In step S2018, the access device 20B transmits a connection request to that GW30B identified by the received GW information.

In step S2019, if the GW30B can accept the connection request transmitted from the access device 20B, the GW30B sets up a route for transferring packets to the mobile terminal 10 and returns a connection request response (OK) to the access device 20B.

In step S2020, the access device 20B transmits a connection request response for notifying that a connection has been established between the mobile terminal 10 and the GW30B, to the mobile terminal 10.

Thirdly, the operation when the mobile terminal 10 terminates a communication and disconnects a connection to a certain network, in a mobile communication system according to this embodiment will be described with reference to FIG. 11.

Figure 11:
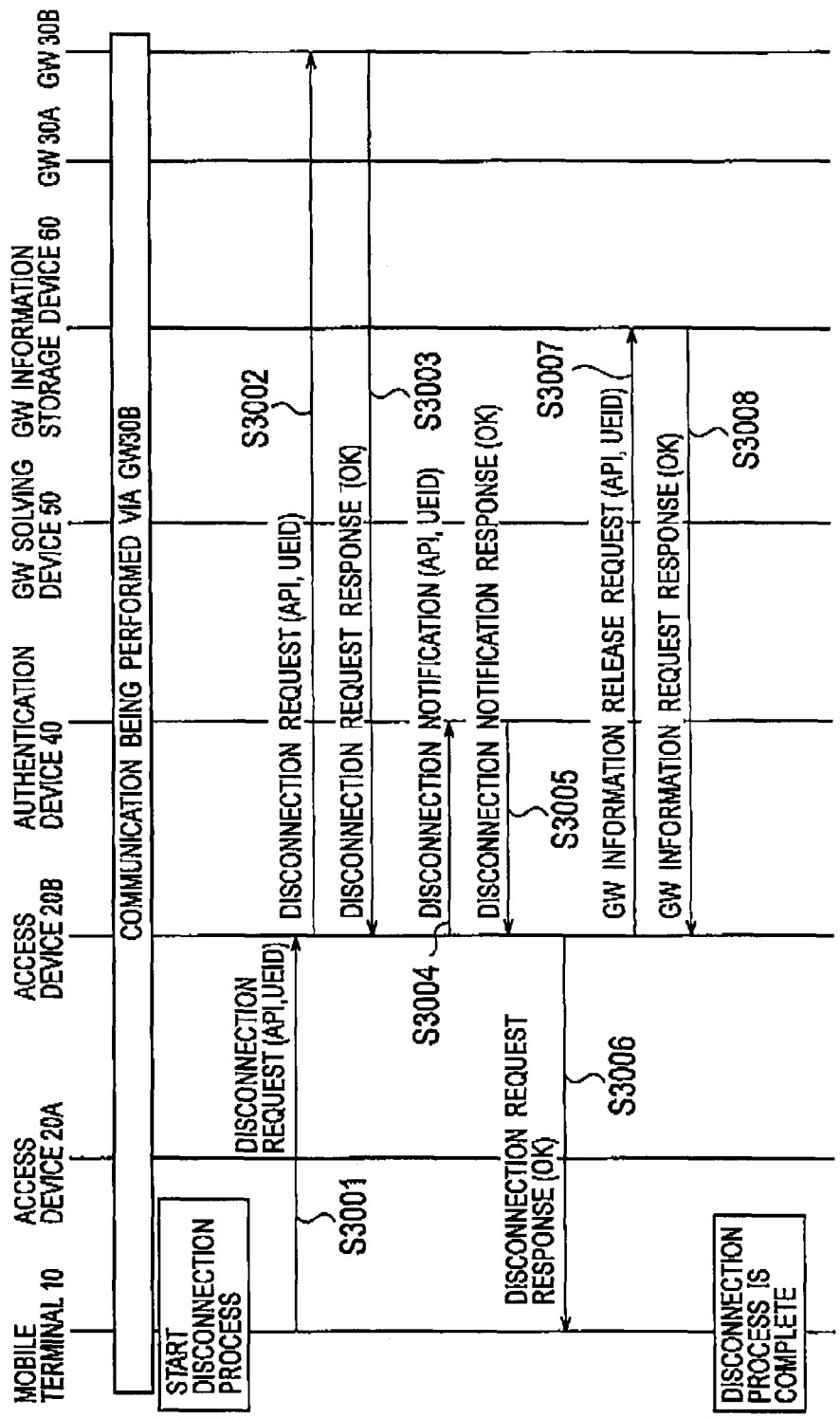
FIG. 11 is a sequence diagram showing a disconnection process in the mobile communication system according to the first embodiment of the present invention.

As shown in FIG. 11, when the mobile terminal 10 communicating with the different network by way of the access device 20B and the GW 30B determines to terminate the communication, in step S3001, the mobile terminal 10 transmits a disconnection request containing an "API" that is identification information of the network to be subjected to the disconnection and the "UEID" that is the identification information of the mobile terminal 10, to the access device.

In step S3002, the access device 20B: refers to GW information which the access device 20B itself holds; identifies the GW30B as the GW corresponding to the "API" and the "UEID" contained in the received disconnection request; and transmits the disconnection request containing the "API" and the "UEID" to the GW30B.

In step S3003, the GW30B disconnects the connection corresponding to the received disconnection request, and transmits a disconnection request response (OK) notifying of that fact, to the access device 20B.

In step S3004, when receiving the disconnection request response from the GW30B, the access device 20B transmits a disconnection notification containing the "API" that is the identification information of the network to be subjected to the disconnection and the "UEID" that is the identification information of the mobile terminal 10, to the authentication device 40 that manages the connection status (communication status) of the mobile terminal 10.

In step S3005, in response to the received disconnection notification, the authentication device 40 updates the connection status of the mobile terminal 10 which the authentication device 40 itself manages, and transmits a disconnection notification response (OK) notifying of that fact, to the access device 20B.

In step S3006, the access device 20B transmits a disconnection request response (OK) notifying that the connection corresponding to the disconnection request mentioned above has been disconnected, to the mobile terminal 10.

In step S3007, the access device 20B transmits a GW information release request containing the "API" that is the identification information of the network subjected to the disconnection and the "UEID" that is the identification information of the mobile terminal 10, in order to request the GW information storage device 60 to delete the entry of the corresponding GW information.

In step S3008, the GW information storage device 40 updates the GW information according to the received GW information release request, and transmits a GW information request response (OK) notifying of that fact, to the access device 20B.

In addition, when the mobile terminal 10 transmits a disconnection request containing the "UEID" only, connections to all the networks are requested to be disconnected. The access device 20B simultaneously transmits disconnection requests to all the corresponding GWs, and the GW information storage device 60 deletes all the entries of the GW information related to the "UEID".

Advantageous Effect of Mobile Communication System according to First Embodiment of Present Invention With the mobile communication system according to the first embodiment of the present invention, when receiving a connection request in handover from the mobile terminal 10, the access device 20B can acquire GW information indicating a GW to be subjected to a connection process, from the GW information storage device 60 without transmitting an API solution request to the GW solution device 50. This allows a decrease in the number of the signal exchange operations, i.e., avoidance of such an unnecessary communication as transmitting a connection request to the GW30A that is in failure, thereby reducing a delay time during a handover.

(Modification 1)

The mobile communication system according to Modification 1 will be described with reference to FIG. 12, focusing on differences from the mobile communication system according to the first embodiment described above.

As shown in FIG. 12, GW information held in the GW information storage device 60 is configured to associate together "unconnected GW list (identification information of a GW whose connection with the mobile terminal has not been attempted to be established)", "connection error list (identification information of a GW whose connection to the mobile terminal has failed to be established)", and the like, in addition to the elements of the GW information shown in FIG. 7.

Note that, in Modification 1, the access device 20 is configured to transmit a GW information registration request to the GW information storage device 60, the GW information registration request containing identification information of a GW that has succeeded in establishing a connection to the mobile terminal, identification information of a GW whose connection to the mobile terminal has failed to be established, identification information of a GW whose connection with the mobile terminal has not been attempted to be established, and the like.

Suppose a case where identification information of a GW whose connection to a mobile terminal 10A has failed to be established exists as a GW information entry held in the GW information storage device 60, and where, for the mobile terminal 10A that newly starts to establish a connection, the access device 20 transmits a GW information registration request to the GW information storage device 60, the GW information registration request containing the identification information of the GW as "identification information of a GW whose connection to the mobile terminal 10A has failed to be established". In this case, the GW information storage device 60 may register the identification information of this GW in the GW information entry as the "connection error list".

As a result, when a GW to which the mobile terminal 10A is being connected becomes not connectable during communications, and thus the mobile terminal 10A selects a new GW, a GW whose connection to the mobile terminal 10A has failed to be established will never be selected. Accordingly, a connection delay during re-connection can be reduced.

(Modification 2)

The mobile communication system according to Modification 2 will be described with reference to FIG. 13, focusing on differences from the mobile communication system according to the first embodiment described above.

In Modification 2, the identification information (UEID) of the mobile terminal and the identification information (API) of the connection destination network forms one piece of identification information.

Specifically, the access device 20 may create one piece of identification information (e.g., NAI: Network Access Identifier or the like) by using the "API" and the "UEID", and may be configured to pair the created identification information (NAI) and an IP address of a GW and register the pair in the GW information storage device 60.

One example of elements of such identification information is shown in FIG. 13.

Here, an "API" in Non-Patent Document 3, for example, is assumed to be the identification information of a connection destination network (see FIG. 13(a)).

As shown in FIG. 13(a), the "API" follows the format of FQDN (fully qualified domain name) that can be solved by a DNS, and includes a "GPRS" of a top level domain name used by the operator, an "MCC (mobile country code)", an "MNC (mobile network code)", and "label" indicating to which external network the mobile terminal will be connected by way of a GW.

In addition, an "IMSI" in Non-Patent Document 3, for example, is assumed to be the identification information of the mobile terminal (see FIG. 13(b)).

As shown in FIG. 13(b), the "IMSI" includes "MNC+MCC+MSIN (mobile subscriber identification number)".

Note that each of "xxx" and "yyy" in FIGS. 13(a) and 13(b) represents an actual numeric value (e.g., "123", "456", or the like).

In the case of making the identification information of the connection destination network and the identification information of the mobile terminal into one piece of identification information in the "NAI" form, a format "MSIN@<Label>.<MNCxxx>.<MCCyyy>.GPRS" is used.

Consequently, it is possible to delete the part "MNC+MCC" that is overlapping information if the identification information takes the form of "IMSI@APN", and thus the length of identification information can be reduced.

Note that, in Modification 2, the GW information storage device 60 may retrieve a necessary element from the format of the "NAI" form and use it in registration of entry of each GW information piece, or may also use a unit of "NAI" instead of the pair of the "API" and the "UEID"

(Modification 3)

In Modification 3, as the function of the GW information storage device 60 is provided in the GW solution device 50, there is no need to install the GW information storage device independently.

In addition, in Modification 3, when a certain entry of the GW information stored in the GW information storage device 60 expires and is thus deleted, and subsequently, a GW information request on the entry is transmitted by the access device 20, the GW solution device 50 may also be configured to register the GW information storage unit 61 of the GW information storage device 60 after transmitting an API solution request to the access device 20.

Consequently, it is possible to reduce one round of message exchange (a GW information registration response and an API solution request).

(Modification 4)

In Modification 4, the "UEID" to be notified of when a GW information registration request or a GW information request for a GW information storage device 60 is received is a temporary UEID (T-UEID) given by a network during an authentication process.

In such a case, an access device 20 holds mapping of the "UEID" and the "T-UEID", converts from the "UEID" contained in a message to the "T-UEID" when receiving the message such as a connection request from the mobile terminal or the like, and includes the converted "T-UEID" in messages to the GW 30, the authentication device 40, the GW information storage 60, or the like as an element, instead of the "UEID" in the other embodiments (or the modifications).

(Modification 5)

The mobile communication system according to Modification 5 will be described with reference to FIG. 14 and FIG. 15, focusing on differences from the mobile communication system according to the first embodiment described above.

Each of the aforementioned mobile communication systems has been described using an example of a network model that does not perform a hierarchical mobility control between the access devices 20 and the GWs 30. In contrast, the mobile communication system according to Modification 5 includes each of the functions of the access devices 20 and the functions of the GWs as functions of nodes of the respective hierarchies in a network that performs the hierarchical mobility control as shown in FIG. 14.

Figure 14:
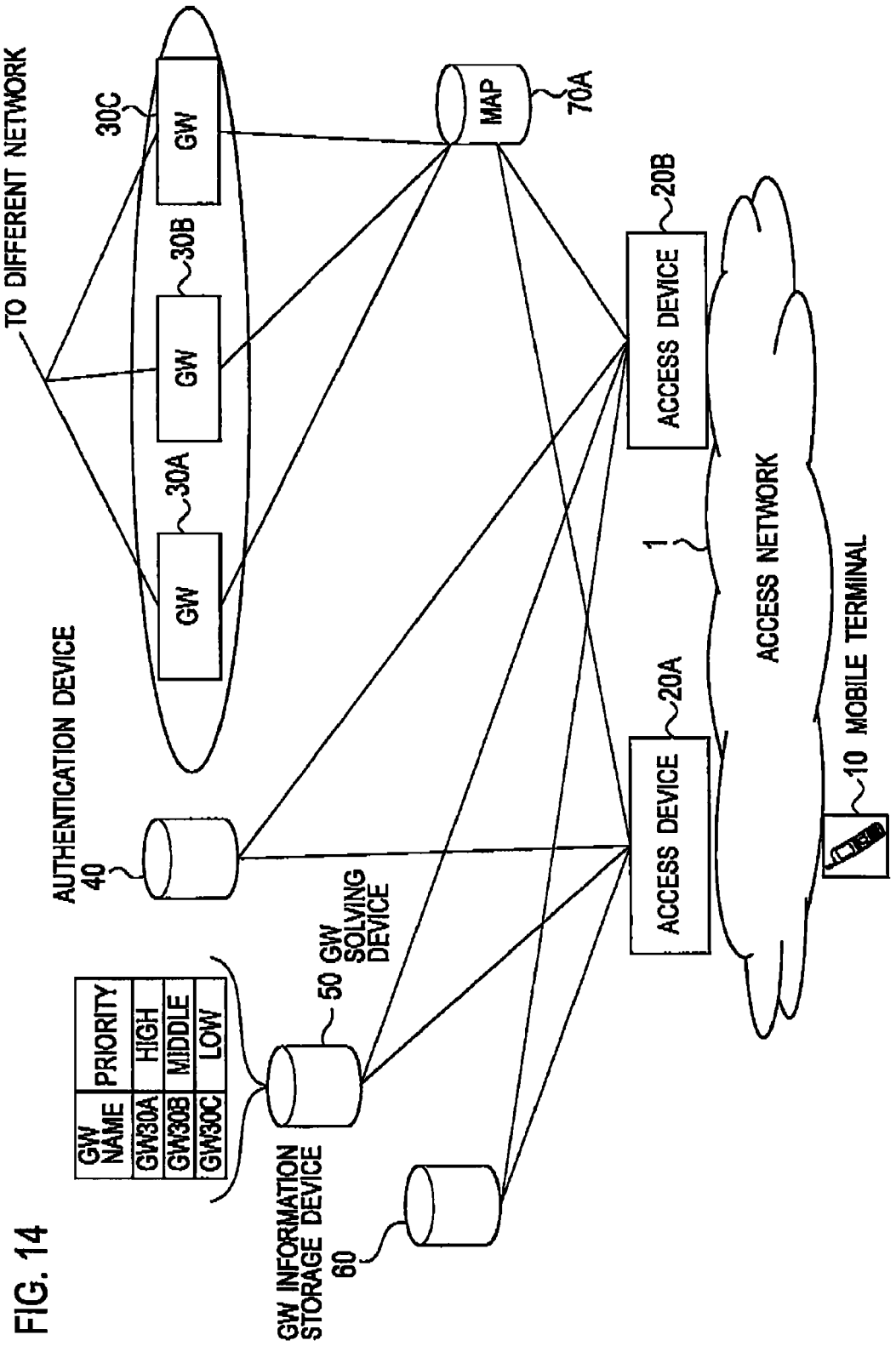
FIG. 14 is a diagram of an overall configuration of the mobile communication system according to Modification 5 of the present invention.

Specifically, as shown in FIG. 14, an MAP (mobility anchor point) 70A is provided between the access devices 20 and the GWs 30, wherein a route control involving a handover of a mobile terminal can be performed between the access devices 20 and the MAP 70A as far as the control takes place between the access devices 20 under the MAP 70A.

In the example of FIG. 14, the MAP 70A is provided with the functions of the GWs for the access devices 20 and the functions of the access devices for the GWs.

The operation during a normal time in the mobile communication system according to Modification 5 will be described below with reference to FIG. 15.

As shown in FIG. 15, the operation of the steps S4001 to S4004 is identical to the operation of the step S1001 to S1004 shown in FIG. 8.

In step S4005, the GW solution device 50 searches a list of MAPs (e.g., MAP 70A/70B/70C . . . ) provided with the function of the GW corresponding to the "API" contained in the received API solution request, and transmits an API solution response containing the searched MAP list to the access device 20A.

In step S4006, from the MAP list contained in the received API solution response, the access device 20A selects a MAP 70A as a MAP to be subjected to a connection process, according to a network policy or the like, and transmits a connection request to the selected MAP 70A.

In step S4007, the MAP 70A transmits an API solution request to the GW solution device 50, the API solution request being for searching for a GW corresponding to the "API" and the "UEID" contained in the received connection request. Note that the API solution request contains an "API" that is identification information of a desired connection destination network.

In step S4008, the GW solution device 50 searches a list of GWs (e.g., GW 30A/30B/30C . . . ) corresponding to the "API" contained in the received API solution request, and transmits an API solution response containing the searched GW list to the MAP 70A.

In step S4009, from the GW list contained in the received API solution response, the MAP 70A selects the GW30A as the GW to be subjected to a connection process, according to a network policy or the like, and transmits a connection request to the selected GW30A.

In step S4010, if the GW30A can accept the connection request transmitted from the MAP 70A, the GW30A sets up a route for transferring packets to the mobile terminal 10 and returns a connection request response (OK) to the MAP 70A.

In step S4011, the MAP 70A transmits the received connection request response (OK) to the access device 20A.

In step S4012, the access device 20A transmits a connection request response notifying that a connection has been established between the mobile terminal 10 and the GW30A, to the mobile terminal 10.

In step S4013, the MAP70A transmits a GW information registration request to the GW information storage device 60, the GW information registration request requesting registration of GW information which associates the "UEID" that is the identification information of the mobile terminal 10, the "API" that is the identification information of the desired connection destination network, and the identification information of the GW30A, with each other.

In step S4014, the access device 20A transmits a GW information registration request to the GW information storage device 60, the GW information registration request requesting registration of the GW information which associates the "UEID" that is the identification information of the mobile terminal, the "API" that is the identification information of the desired connection destination network, and the identification information of the MAP 70A, with each other.

In step S4015, the GW information storage device 60 registers the GW information contained in the GW information registration request received from the MAP 70A, and transmits a GW information registration response (OK) indicating that the registration process has been completed, to the MAP 70A.

In step S4016, the GW information storage device 60 registers the GW information contained in the GW information registration request that is received from the access device 20A, and transmits a GW information registration response (OK) indicating that the registration process has been completed, to the access device 20A.

(Modification 6)

In each of the aforementioned mobile communication systems, the authentication device 40 has the function to manage the connection status (communication status) of the mobile terminal, and is configured to provide the information (initial connection flag or HO flag) as to whether or not the mobile terminal is performing a handover, in response to an authentication request from the access device 20. In contrast, in Modification 6, such a function is provided in a device independent of the authentication device 40 and procedure for checking the connection status (communication status) of the mobile terminal between the authentication device 40 and this device after an authentication process may be provided.

In addition, it is possible to have a configuration where the function to manage the connection status (communication status) of the mobile terminal is arranged in the GW information storage device 60.

Specifically, it is possible to have a configuration where a device equipped with such a function serves as a part of the GW information storage device 60 or where such a function itself is provided in the GW information storage device 60.

Note that, in a case where GW information is stored and "entry expiry date" is set to "indefinite", the GW information storage device 60 includes the function to manage the connection status (communication status) of the mobile terminal.

(Modification 7)

In each embodiment and modification described above, the example is described in which the GW solution device 50 exists as an independent device. In Modification 7, however, the mobile terminal 10 is includes the function of the GW solution device 50.

Specifically, the mobile terminal 10 according to Modification 7 holds information on GWs (GW list) corresponding to identification information (API) of a different network, and is configured to notify the access device 20 of a GW to be connected to the mobile terminal 10 according to a connection request.

In addition, as shown in FIG. 4, the mobile terminal 10 may be configured to prioritize and manage the GWs to be connected to the mobile terminal 10.

Although the present invention has been described thus far in detail with the aforementioned embodiments, it is apparent that the present invention is not limited to the embodiments explained in the specification. The present invention can be carried out in adjusted and modified forms without deviating from the gist and scope of the present invention to be defined by the description in the scope of claims. Therefore, the description in the specification shall be intended for illustrative purposes, and not have any limiting meaning to the present invention.

Note that the content of Japanese Patent Application No. 2007-000796 (filed on Jan. 5, 2007) is incorporated herein by reference in its entirety.

INDUSTRIAL APPLICABILITY

As described above, the mobile communication system, the mobile communication method, the access device, and the gateway information storage device of the present invention is capable of, when a mobile terminal moves between access devices not provided with a function to transfer context information, uniquely identifying a GW which the mobile terminal uses before moving, and achieving the following challenges for conventional mobile communication systems: to avoid occurrence of a delay in the connection time attributable to an inappropriate selection of a GW that occurs during a handover due to the selection policy of a GW or GW congestion, failure of a GW, or the like; and to prevent a delay in a handover process from increasing; and therefore are useful.

The invention claimed is:

1. A mobile communication system comprising a gateway information storage device, a first access device, and a second access device and configured to refrain from using a function to transfer, from the first access device to the second access device, context information on a mobile terminal including gateway information indicating a gateway to which the mobile terminal is being connected, during a handover from the first access device to the second access device by the mobile terminal, wherein the gateway information storage device comprises a gateway information storage unit configured to store the gateway information, the first access device and the second access device are configured to be able to connect to the gateway, the second access device comprises:

a gateway information acquiring unit configured to acquire the gateway information from the gateway information storage device in response to a connection request in handover that is received from the mobile terminal, during the handover; and a connection processor unit configured to establish a connection between the mobile terminal and the gateway identified by the gateway information acquired from the gateway information storage device, during the handover, and the connection processor unit is configured to establish a connection between the gateway and the mobile terminal, based on the connection request and the gateway information.

2. A mobile communication method performed by a mobile communication system comprising a gateway information storage device, a first access device, and a second access device and configured to refrain from using a function to transfer, from the first access device to the second access device, context information on a mobile terminal including gateway information indicating a gateway to which the mobile terminal is being connected, during a handover from the first access device to the second access device by the mobile terminal, wherein the gateway information storage device stores the gateway information, and indicating a gateway to which a mobile terminal is being connected;

the first access device and the second access device are configured to be able to connect to the gateway, the method comprising:

a step A of acquiring, at the second access device, the gateway information from the gateway information storage device in response to a connection request that is received from the mobile terminal, during the handover; and a step B of establishing, at the second access device, a connection between the mobile terminal and the gateway identified by the gateway information acquired from the gateway information storage device, and in the step B, connection between the gateway and the mobile terminal is established, based on the connection request and the gateway information.

3. An access device configured to function as a second access device in a mobile communication system comprising a gateway information storage device, a first access device, and a second access device and configured to retrain from using a function to transfer, from the first access device to the second access device, context information on a mobile terminal including gateway information indicating a gateway to which the mobile terminal is being connected, during a handover from the first access device to the second access device by the mobile terminal, comprising:

a gateway information acquiring unit configured to acquire the gateway information from a gateway information storage device in response to a connection request that is received from the mobile terminal, during the handover, and a connection processor unit configured to establish a connection between the mobile terminal and the gateway identified by the gateway information acquired from the gateway information storage device, during the handover, wherein the access device is configured to be able to connect to the gateway that is connectable to the first access device, and the connection processor unit is configured to establish a connection between the gateway and the mobile terminal, based on the connection request that is received from the mobile terminal and the gateway information.

* * * * *